United States Patent
Wu et al.

(10) Patent No.: US 10,389,682 B1
(45) Date of Patent: Aug. 20, 2019

(54) COORDINATION OF LOCAL WIDEBAND ANTI-JAM MODEMS

(71) Applicant: ARCHITECTURE TECHNOLOGY, INC., Eden Prairie, MN (US)

(72) Inventors: John Wu, Eden Prairie, MN (US); Nathan E. Bahr, Eden Prairie, MN (US); Ranga S. Ramanujan, Medina, MN (US)

( * ) Notice: Subject to any disclaimer, the term of this patent is extended or adjusted under 35 U.S.C. 154(b) by 0 days.

(21) Appl. No.: 16/249,341

(22) Filed: Jan. 16, 2019

Related U.S. Application Data (60) Provisional application No. 62/791,380, filed on Jan. 11, 2019.

(51) Int. Cl.
*H04L 29/12* (2006.01)
*H04L 12/741* (2013.01)

(52) U.S. Cl.
CPC ........ *H04L 61/2592* (2013.01); *H04L 45/745* (2013.01); *H04L 61/2007* (2013.01)

(58) Field of Classification Search
CPC ..................... H04L 61/2592; H04L 45/745; H04L 61/2007
See application file for complete search history.

(56) References Cited

U.S. PATENT DOCUMENTS

| | | | |
|---|---|---|---|
| 6,775,251 B1 * | 8/2004 | Wiedeman | H04B 7/18558 370/316 |
| 9,729,581 B1 * | 8/2017 | Skene | H04L 63/20 |
| 2011/0116499 A1 * | 5/2011 | Lim | H04L 45/22 370/355 |
| 2011/0274108 A1 * | 11/2011 | Fan | H04L 12/4633 370/390 |
| 2012/0082161 A1 * | 4/2012 | Leung | H04L 12/4633 370/392 |
| 2012/0218936 A1 * | 8/2012 | Fleeman | H04B 7/18563 370/316 |

OTHER PUBLICATIONS

Wu, et al., "ADNS IPv6 Transition Architecture and Analysis" IEEE MILCOM 2014, pp. 1-6, Oct. 2014, USA.

* cited by examiner

*Primary Examiner* — Kashif Siddiqui
(74) *Attorney, Agent, or Firm* — Carlson, Caspers, Vandenburgh & Lindquist, P.A.

(57) ABSTRACT

Embodiments for a method of coordinating wideband anti-jam modems (WAMs) are provided. The method includes receiving an IP packet at a first edge module from a router, wherein the router is configured with the first edge module as a default route. It is determined whether to send the information corresponding to the IP packet via a first WAM corresponding to the first edge module or via a second WAM corresponding to a second edge module. If the information is to be sent via the first WAM, information corresponding to the IP packet is forwarded to the first WAM. If the information is to be sent via the second WAM, the IP packet is encapsulated in a transfer packet for the second edge module corresponding to the second WAM and the transfer packet is sent to the router for forwarding to the second edge module corresponding to the second WAM.

20 Claims, 7 Drawing Sheets

COORDINATION OF LOCAL WIDEBAND ANTI-JAM MODEMS

RELATED APPLICATIONS

This application claims the benefit of U.S. Provisional Application No. 62/791,380 filed on Jan. 11, 2019, entitled "COORDINATION OF LOCAL WIDEBAND ANTI-JAM MODEMS", which is hereby incorporated herein by reference.

GOVERNMENT CONTRACTS

This invention was made with government support under contract N68335-18-C-0213 awarded by the Navy. The government may have certain rights in the invention.

BACKGROUND

There is a desire to use wideband anti-jam modems (WAMs) by the United States Navy for communication between vessels and/or land stations over satellite communication (SATCOM) links. The desired WAMs would be able to send and receive signals between one another via a satellite in accordance with a WAM direct sequence spread spectrum (DSSS) mode specification (e.g., version 0.8 or version 2.0) promulgated by the United States Navy. Such WAMs will enable communication between navy vessels and the mainland but will need to be efficiently integrated into the existing Navy networks.

BRIEF DESCRIPTION

Embodiments for a method of coordinating wideband anti-jam modems (WAMs) are provided. The method includes receiving an IP packet at a first edge module from a router, wherein the router is configured with the first edge module as a default route. The method also includes determining whether to send the information corresponding to the IP packet via a first WAM corresponding to the first edge module or via a second WAM corresponding to a second edge module. If the information is to be sent via the first WAM, the information corresponding to the IP packet is forwarded to the first WAM. If the information is to be sent via the second WAM, the IP packet is encapsulated in a transfer packet for the second edge module corresponding to the second WAM and the transfer packet is sent to the router for forwarding to the second edge module corresponding to the second WAM.

Embodiments for a method of coordinating wideband anti-jam modems (WAMs) are also provided. The method includes receiving IP packets at the first edge module from a router. The IP packets have a destination reachable via a satellite communication link through a first WAM or a second WAM. The router is configured with the first edge module as a default route. For each packet of the IP packets, the method also includes determining whether to send information corresponding to the packet to a first WAM or a second WAM, wherein the first edge module is communicatively disposed between the first WAM and the router, wherein a second edge module is communicatively disposed between the second WAM and the router. For information that is to be sent via the first WAM, that information is forwarded to the first WAM. For information that is to be sent via the second WAM, the IP packet corresponding to that information is encapsulated in a transfer packet for the second edge module and the transfer packet is sent to the router for forwarding to the second edge module.

Embodiments for a program product are also provided. The program product includes a non-transitory processor readable medium having software stored thereon. The software, when executed by one or more processing devices, is configured to receive an IP packet from a router. The router is configured with a first device having the one or more processing devices therein as a default route. The software is also configured to send the information corresponding to the IP packet via a first wideband anti-jam modem (WAM) corresponding to the first device or via a second WAM corresponding to a second device. If the information is to be sent via the first WAM, information corresponding to the IP packet is forwarded to the first WAM. If the information is to be sent via the second WAM, the IP packet is encapsulated in a transfer packet for the second device corresponding to the second WAM and the transfer packet is sent to the router for forwarding to the second device corresponding to the second WAM.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

The proposed wideband anti-jam modems (WAMs) would each include a single transmitter and a plurality of receivers. The proposed systems separate the WAMs into distinct groups referred to as communities-of-interest (COIs). Each COI consists of a certain number of channels and includes a number of WAMs less than or equal to that number of channels. Each WAM of the COI is assigned a different one of the channels of the COI and the transmitter of that WAM is set to transmit on the assigned channel at all times. The number of channels of the COI is chosen to correspond to the number of receivers of each WAM. In these prior systems, each WAM has 48 receivers, and so each COI includes 49 channels. Since each WAM is set to transmit on a distinct one of the 49 channels, up to 49 WAMs can be included in a single COI. Each of the 48 receivers of a WAM is set to receive on a different one of the remaining 48 channels, excluding the one channel that the transmitter for that WAM is set to transmit on. Thus, each WAM transmits on one of the 49 channels and receives on each of the remaining 48 channels. With each WAM set-up in this way, all WAMs in a COI can communicate with one another at all times.

Figure 1:
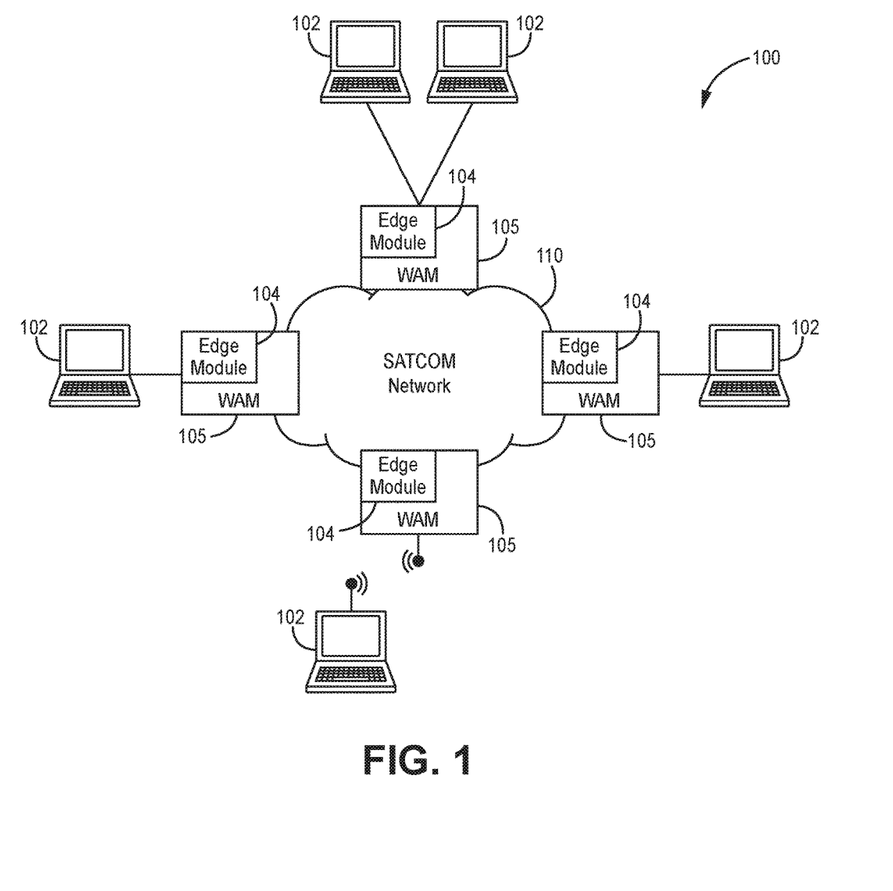
FIG. 1 is a block diagram of an example network implementing edge modules with wideband anti-jam modems (WAMs)

FIG. 1 is a block diagram of an example network 100 implementing edge modules 104 with wideband anti-jam modems (WAMs) 105 to coordinate information transmitted over the WAMs 105. Network 100 includes a plurality of endpoint devices 102 communicatively coupled together via a satellite communications (SATCOM) network 110. Endpoint devices 102 communicate IP packets therebetween via the SATCOM network 110. Outside of the SATCOM network 110, behind the WAMs 105, IP subnets operate in accordance with an IP protocol, such as the IP version 4 (IPv4) protocol or the IP version 6 (IPv6) protocol. In an example, the physical layer of the SATCOM network 110 is transmitted by the WAMs 105 in accordance with a WAM direct sequence spread spectrum (DSSS) mode specification (e.g., version 0.8 or version 2.0) promulgated by the United States Navy.

In an example, the edge modules 104 send packets between one another, over the SATCOM network 110 in accordance with a ZOOM protocol. In an example, the edge modules 104 cooperate with one another to enable efficient communication of IP packets between the endpoint devices 102 over the SATCOM network 110. The ZOOM protocol can enable such efficient transport of the IP packets across the SATCOM network 110. The edge modules 104 can intercept IP packets traveling into the SATCOM network 110 and translate the IP packets into ZOOM packets for transport across the SATCOM network 110. On the receiving end of SATCOM links, the edge modules 104 can translate the ZOOM packets back into their corresponding IP packets and forward the IP packets onto their destinations. The edge modules 104 can also filter out (e.g., discard) certain IP packets going into the SATCOM network 110 without sending information corresponding to those IP packets into the SATCOM network 110 in order to reduce the number of bits sent over the broadcast network. In particular, the edge modules 104 can identify and filter out IP packets that have not destination reachable over the SATCOM network 110. More information on the translation and filtering of the edge modules 104 is provided in U.S. patent application Ser. No. 16/249,287, titled "IP PACKET TRANSLATION TO PIGGYBACK NETWORKING INFORMATION", filed on even date herewith, which is hereby incorporated herein by reference.

Each edge module 104 maintains a table of forward destinations. The table of forward destinations lists the destinations that are reachable from the edge module 104 via the SATCOM network 110. The table of forward destinations includes an indication of the destinations that are reachable via the broadcast network 110. In some examples, the table can also include indications of destinations that are known to be not reachable. The edge modules 104 can exchange reachability information to maintain their tables. That is, each edge module 104 can send reachability information to the other edge modules 104 of the SATCOM network 110. The reachability information sent by an edge module 104 can indicate which endpoint devices 102 or subnets are reachable behind that edge module 104. Thus, each edge module 104 can communicate to the other edge modules 104 in the SATCOM network 110 the endpoint devices 102 or subnets that are reachable behind that edge module 104. The edge modules 104 will then receive information for all endpoint devices 102 or subnets that are reachable behind other edge modules 104 of the SATCOM network 110. The edge modules 104 can aggregate and store this information in their table of forward destinations. The reachability information can be exchanged in any suitable manner. In an example, the reachability information is exchanged by piggybacking the information with information from IP packets in a ZOOM packet. More information regarding such reachability, exchange thereof, and the table of forward destinations is provided in the above referenced application Ser. No. 16/249,287.

Figure 2:
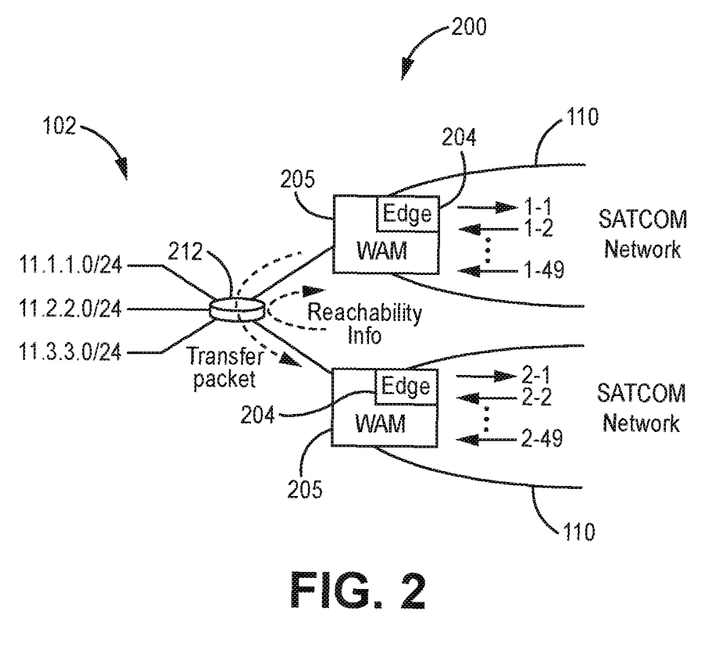
FIG. 2 is a block diagram of a system including multiple WAMs with corresponding edge modules that coordinate information transmitted over the WAMs.

FIG. 2 is a block diagram of an example system 200 having two or more WAMs 205 having a common one or more endpoint devices 102 or subnets behind the WAMs 205. Each WAM 205 has a corresponding edge module 204, and the edge modules 204 cooperate with one another to coordinate which information from the one or more endpoint devices 102 or subnets is sent over which of the two or more WAMs 205.

Each of the two or more WAMs 205 can transmit over a distinct SATCOM network 110, or one or more of the WAMs 205 can transmit over a common SATCOM network 110. In either case, the edge modules 204 for each of the two or more WAMs 205, exchange information with one another to enable the edge modules 204 to determine which information is to be sent via which of the two or more WAMs 205. The determination of which WAM 205 to send the information via can be based on any desirable characteristic, such as whether a destination for the information is reachable via a respective WAM 205, based on a load balancing scheme, or based on concurrent transmission of information over multiple SATCOM links.

System 200 also includes one or more routers 212 communicatively coupled behind each edge module 204. The one or more routers 212 communicatively couple the edge modules 204 together over one or more IP networks, such as one or more subnets. Thus, the edge modules 204 can communicate with one another using IP packets via the one or more routers 212 and corresponding IP network(s). The network link(s) 214 in the one or more IP networks communicatively coupling the one or more routers 212 together can have any suitable form, including wired links (e.g., Ethernet) and wireless links (e.g., radio frequency, line of sight (LoS)). In an example, a first edge module 204 and a second edge module 204 are communicatively coupled to a respective router 212 via a respective single network link (e.g., Ethernet link). That is, the first edge module 204 is communicatively coupled to a first router 212 via a single network link and the second edge module 204 is communicatively coupled to the first router 212 via a single network link.

Figure 3:
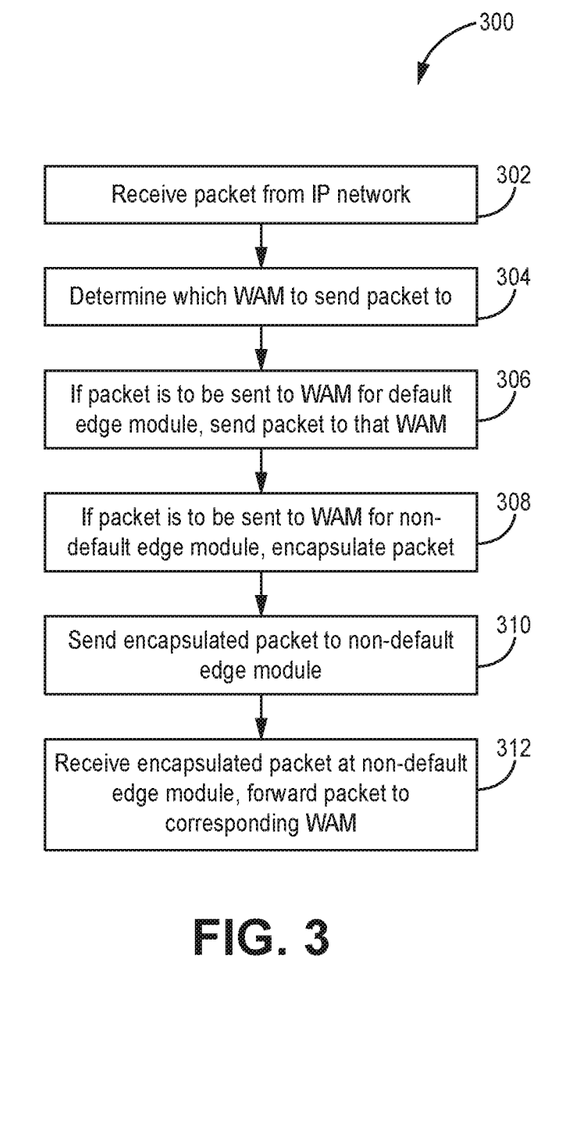
FIG. 3 is a flow diagram of an example method of coordinating local WAMs with corresponding edge modules.

FIG. 3 is a flow diagram of an example method 300 of coordinating WAMs 205 with their corresponding edge modules 204. In an example, one edge module 204 (also referred to herein as the "default edge module") of the edge modules 204 can be set as a default route for the router(s) 212, such that all packets from endpoint devices 102 to a destination that is outside the subnet(s) of the IP networks behind the edge modules 204 are forwarded to the default edge module 204. The default edge module 204, therefore, receives all packets outgoing from the IP networks therebehind to the SATCOM network 110 (block 302). In response to receiving a packet from the one or more routers 212, edge module 204 determines what to do with the packet. In an example, determining what to do with the packet can include determining whether to discard the packet as discussed above, and if the packet is not discarded, determining via which of the WAMs 205 to send information corresponding to the packet (block 304).

Since all packets to destinations reachable via the one or more SATCOM networks 110 are initially sent on the default route to the default edge module 204, the default edge module 204 distributes the packets (or information indicative thereof) to the other (non-default) edge modules 204. To determine which of the WAMs 205 to send information corresponding to the packets via, the edge modules 204 can exchange information. In an example, the information exchanged can include the non-default edge modules 204 sending (e.g., periodically) their table of forward destinations to the default edge module 204. The default edge module 204 can then store the table of forward destinations from each non-default edge module 204 with an association to that non-default edge module 204.

In one example, determining which WAM 205 to send information corresponding to a packet via, can include checking the tables of forward destinations for the edge modules 204 (both default and non-default) and determining whether a destination of the packet is reachable via each of the WAMs 205. If any destination(s) for a packet are only reachable via a single WAM 205 of the WAMs 205, the default edge module 204 can take action to send information corresponding to the packet to that single WAM 205. Notably, if there are multiple destinations for a packet, and different destinations are reachable only via different single WAMs 205, the default edge module 204 takes action to send information corresponding to the packet to each of the different single WAMs 205. For example, if a first destination is reachable only via a first WAM 205 and a second destination is reachable only via a second WAM 205, the first WAM 205 and the second WAM 205 are each considered a "single WAM" 205 and the default edge module 204 takes action to send information corresponding to the packet to both the first WAM 205 and the second WAM 205.

If a single WAM 205 is the WAM 205 in front of the default edge module 204, the default edge module 204 can send information corresponding to the packet directly to the single WAM 205 for transmission over its SATCOM network 110 (block 306). This information can take any suitable form including in the form of the IP packet itself, or in the form of a ZOOM packet including information corresponding to the IP packet as described in above referenced application Ser. No. 16/249,287.

If a single WAM 205 is a WAM in front of a non-default edge module 204, the default edge module 204 can encapsulate the IP packet or information indicative thereof in another IP packet to form a transfer packet (block 308). The transfer packet can be configured in accordance with the IP protocol such that the transfer packet will be forwarded by the one or more routers 212 or their IP network(s) to the non-default edge module 204 corresponding to the single WAM 205. The default edge module 204 can then send the transfer packet to the one or more routers 212 for forwarding to the appropriate non-default edge module 204 (block 310).

In an example, determining which WAM 205 to send the packet via can include determining based on a load balancing scheme that attempts to control the relative number of packets that are sent over the multiple WAMs 205. For example, in order to free up bandwidth on a first SATCOM link, some of the packets (or information indicative thereof) that would otherwise be sent over the first SATCOM link can be re-directed to a second SATCOM link. An implementation of this example includes a load balancing scheme the offloads packets from one SATCOM link when the bandwidth used on that SATCOM link reaches a threshold level. Another example load balancing scheme may try to evenly distribute a flow of packets between multiple SATCOM links. Other load balancing schemes can also be used.

Load balancing among SATCOM links is possible when a given destination for a packet is reachable via multiple SATCOM links. Such a situation is likely if the WAMs 205 implement dynamic receiver tuning and are all part of a single COI as described in U.S. patent application Ser. No. 16/249,331, titled "DYNAMIC RECEIVER TUNING FOR A WIDEBAND ANTI-JAM MODEM", filed on even date herewith, which is hereby incorporated herein by reference.

In an example, determining which WAM 205 to send the packet via can include determining based on a link aggregation scheme. The link aggregation scheme can, for example, send a set of packets (or information indicative thereof) (e.g., a set of packets from a common stream), concurrently over multiple SATCOM links (i.e., multiple WAMs 205) in situations where it is desirable to get the set of packets to a destination quicker than possible via a single SATCOM link. In such a situation, the edge module 204 can cooperate with one another to aggregate two or more SATCOM links by distributing the set of packets across the two or more SATCOM links, so that different packets are traversing the different SATCOM links concurrently. The default edge module 204 can determine to distribute the set of packets among the multiple WAMs 205 and forward packets to the WAM 205 associated with the default edge module 204 and can encapsulate other packets into transfer packets for sending to other edge modules 204 for other WAMs 205.

In any case, the default edge module 204 can receive multiple packets from the one or more routers 212 over time and can, for each packet, determine which WAM 205 to send information corresponding to the packet over. The WAMs 205 considered by the default edge module 204 for sending of packet information are the WAMs 205 communicatively coupled to the default edge module 204 via the one or more routers 212 as discussed above. For each item of information that is to be sent via the WAM 205 in front of the default edge module 204, the default edge module 204 can send that information in the appropriate form (e.g., ZOOM packet, IP packet) to that WAM 205 (or the software module implementing the WAM 205). For each item of information that is to be sent via a different WAM 205, the default edge module 204 can encapsulate that information to form a transfer packet and send the transfer packet to the one or more routers 212 for forwarding to the appropriate edge module 204.

A non-default edge module 204 that receives a transfer packet can decapsulate the transfer packet and forward the information corresponding to the corresponding IP packet to the WAM 205 in front of that non-default edge module 204 (block 312). The non-default edge module 204 can forward the information to the WAM 205 in the appropriate form, such as in accordance with the ZOOM protocol or IP protocol.

Figure 4:
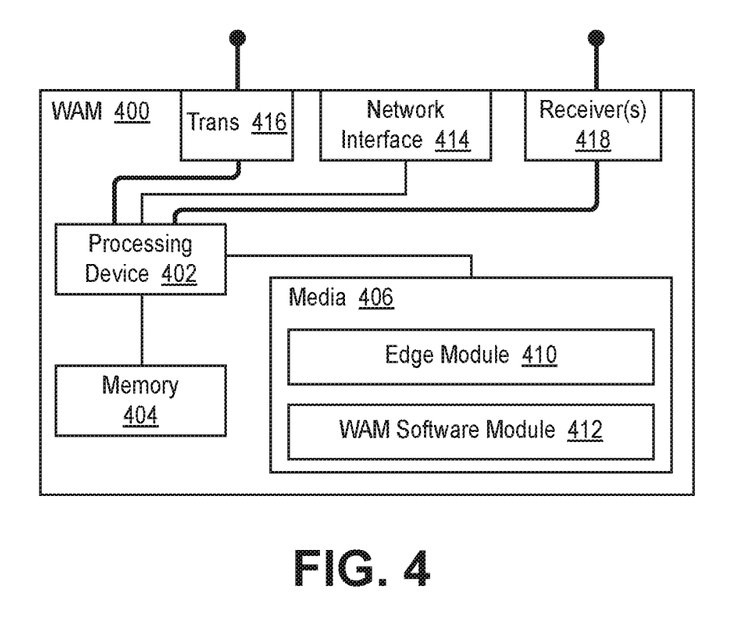
FIG. 4 is a block diagram of an example WAM having an edge module loaded therein.

FIG. 4 is a block diagram of an example WAM 400. Each WAM 400 includes a WAM software module 412 stored on a storage medium 406 of the WAM 400. The WAM module 412 is software including instructions to implement the functionality of a WAM 400 described herein. The WAM module 412 can include instructions which, when executed by one or more processing devices 402 of the WAM 400, perform functionality of a WAM 400 described herein. In this example, the WAM 400 also includes an edge software module 410 stored on the storage medium 406. The edge module 412 is software including instructions which, when executed by the one or more processing devices 402 of the WAM 400, cause the WAM 400 to perform the functionality of an edge module described herein. In an example, the edge module 410 can interact with one or more application programming interfaces (APIs) of the WAM module 412 to communicate information (e.g., information corresponding to an IP packet) between the WAM module 412 and the edge module 410. The edge module 410 can be a software module that is loaded onto a hardware device at the factory during manufacture of the WAM 400 or can be an add-on software module that is loaded onto a commercial off-the-shelf (COTS) device (e.g., WAM) in the field.

The one or more processing devices 402 of the WAM 400 can execute the instructions of the edge module 410 and the WAM module 412. The one or more processing devices 402 can include a general-purpose processor or a special purpose processor. The instructions of the edge module 410 and WAM module 412 are stored (or otherwise embodied) on or in an appropriate storage medium or media 406 (such as a flash or other non-volatile memory) from which the instructions are readable by the processing device(s) 402 for execution thereby. The WAM 400 also includes memory 404 that is coupled to the processing device(s) 402 for storing instructions (and related data) during execution by the processing device(s) 402. Memory 404 comprises, in one implementation, any suitable form or random-access memory (RAM) now known or later developed, such as dynamic random-access memory (DRAM). In other implementations, other types of memory are used.

The WAM 400 also includes one or more network interfaces 414 for communicating with devices therebehind, a transmitter 416 for transmitting over a SATCOM link (channel) to other WAMs 400 and one or more receivers 418 for receiving over one or more SATCOM links (channels) from other WAMs 400. The one or more network interfaces 414, transmitter 416, and receiver(s) 418 can be coupled to the one or more processing devices 402. The one or more network interfaces 414 can include wired and/or wireless interfaces such as an Ethernet interface, an IEEE 802.11 transceiver, or other interface.

Figure 5:
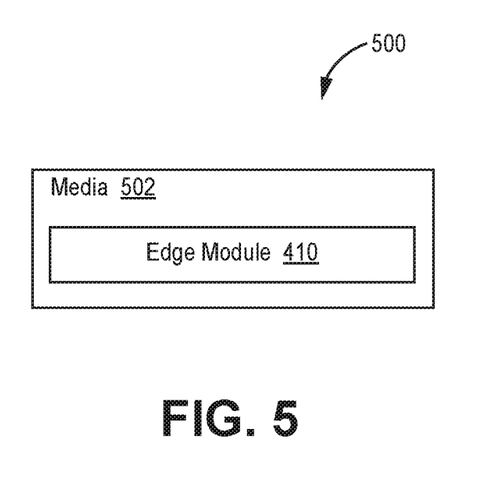
FIG. 5 is a block diagram of an example program product including an edge module for a WAM.

FIG. 5 is a block diagram of an example software product edge module 500. The software product 500 includes a computer readable medium 502 having an edge software module 410 stored thereon. The edge software module 410 can be loaded onto an appropriate hardware device (e.g., a WAM 400). The edge module 410 includes instructions that are stored or other embodied on the computer readable medium 502 that is distinct from any processing device(s), memory, or other associated hardware for executing those instructions. The edge module 410 instructions can be loaded onto an appropriate hardware device, such as the WAM 400 shown in FIG. 4, for the hardware device to execute the instructions and perform the functionality (or a portion thereof) of an edge module described herein. The computer readable medium 502 on which the edge module 410 is stored can be any suitable computer readable media, such as a magnetic media such as a hard disk drive (HDD), optical media such as a CD, DVD, Blu-Ray disk, or a non-volatile electric media such as a solid-state drive (SDD), flash media, or EEPROM. Such computer readable media can be standalone media (e.g., a USB stick or CD) or can be computer readable media within a computing device (e.g., a server or network accessible storage).

Figure 6A:
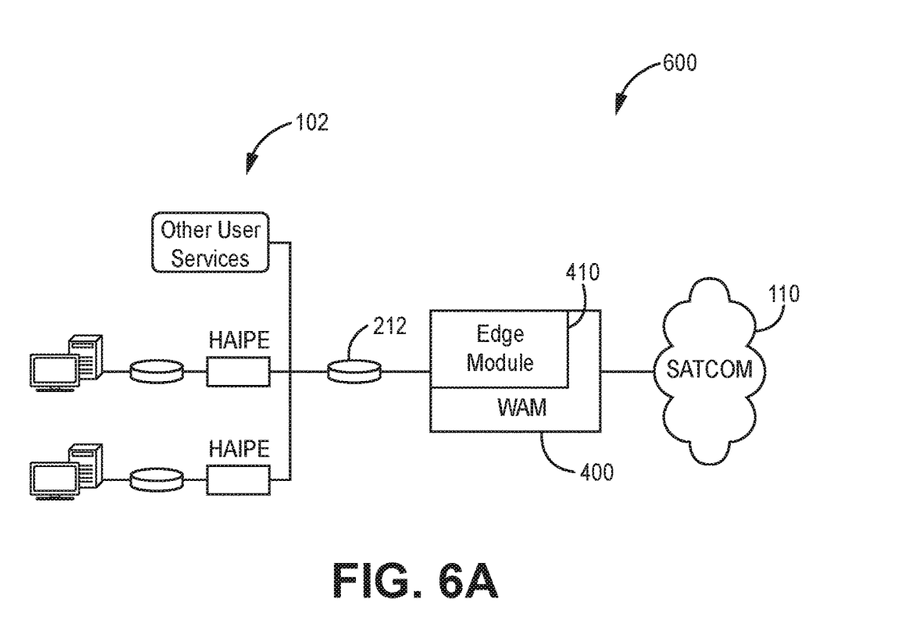
FIG. 6A is a block diagram of an example system in which an edge module is loaded onto a WAM.

FIG. 6A is a block diagram of an example system 600 in which an edge software module 410 is embedded into a commercial off-the-shelf (COTS) WAM 400, causing the WAM device to perform the functionality of an edge module described herein. System 600 also includes, SATCOM network 110. The WAM 400 operates in accordance with a WAM direct sequence spread spectrum (DSSS) mode specification (e.g., version 0.8 or version 2.0) promulgated by the United States Navy. The WAM 400 has the edge software module 410 loaded thereon which, when executed by processing device(s) of the WAM 400, causes the WAM 400 to perform the functions described herein. The WAM 400 can also perform the regular functions of a WAM, which includes communicating in accordance with the DSSS specification. The edge module 410 can interact with (e.g., APIs) of a WAM software module running on the WAM 400 to cause the WAM 400 to perform the actions described herein. The system 600 can also include a router (e.g., ADNS router) 212 and a plurality of endpoint devices 102 communicatively disposed behind the WAM 400.

Figure 6B:
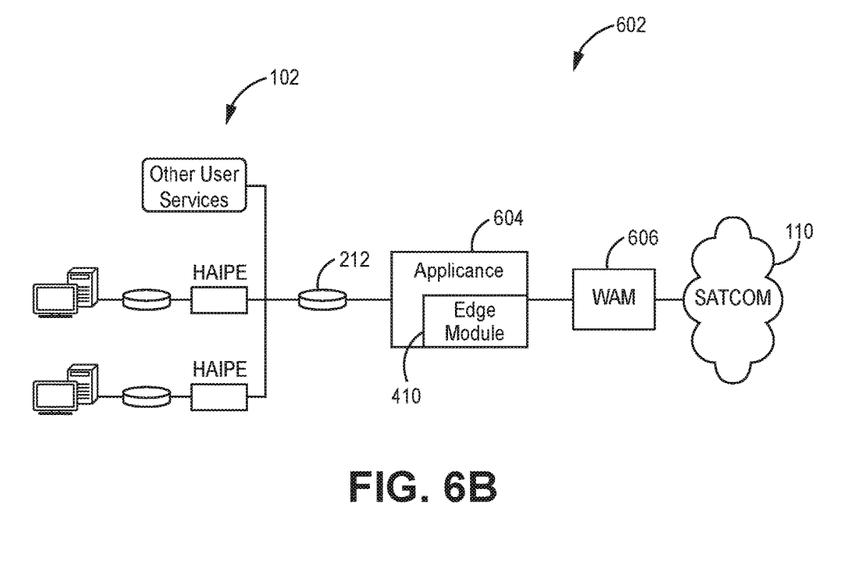
FIG. 6B is a block diagram of an example system in which an edge module is loaded onto a stand-alone hardware appliance that communicates with a WAM over a network interface.

FIG. 6B is a block diagram of an example system 602 including a stand-alone hardware appliance 604 that executes an edge software module 410. The stand-alone hardware appliance 604 can include the edge software module 410 loaded onto media therein. The hardware appliance 604 can include a network interface (e.g., Ethernet interface) to send and receive packets with a WAM 606. The hardware appliance 604 can also include one or more other network interfaces (e.g., Ethernet and/or Wi-Fi interfaces) for sending and receiving packets with endpoint devices 102 and/or subnet(s) behind the appliance 604.

The edge software module 410 can cause the appliance 604 to send packets (or other messages) over the network interface to the WAM 606, wherein the packets include information corresponding to the IP packets for transmission over the SATCOM network 110 as discussed above. The WAM 606 can be disposed in front of the stand-alone appliance 604 and can be the WAM 606 to which that edge module 410 on the stand-alone appliance 604 corresponds. That is, information for transmission via the WAM 606 can be sent to the edge module 410 as discussed above. The system 602 can also include a router (e.g., ADNS router) 212 and a plurality of endpoint devices 102 communicatively disposed behind the stand-alone appliance 604.

What is claimed is:

1. A method of coordinating wideband anti-jam modems (WAMs), the method comprising:
    receiving an IP packet at a first edge module from a router, wherein the router is configured with the first edge module as a default route;
    determining whether to send the information corresponding to the IP packet via a first WAM corresponding to the first edge module or via a second WAM corresponding to a second edge module;
    if the information is to be sent via the first WAM, forwarding information corresponding to the IP packet to the first WAM; and
    if the information is to be sent via the second WAM:
        encapsulating the IP packet in a transfer packet for the second edge module corresponding to the second WAM; and
        sending the transfer packet to the router for forwarding to the second edge module corresponding to the second WAM.

2. The method of claim 1, wherein determining whether to send the information includes checking a table of forward destinations for the first edge module and checking a table of forward destinations for the second edge module, if a destination of the IP packet is listed in the table of forward destinations for the first edge module, determine that the IP packet is to be sent to the first WAM, if a destination of the IP packet is listed in the table of forward destinations for the second edge module, determine that the IP packet is to be sent to the second WAM.

3. The method of claim 2, wherein information corresponding to the IP packet is sent to both the first WAM and the second WAM.

4. The method of claim 1, wherein a route to the destination exists via both the first WAM and the second WAM, wherein determining whether to send the information includes determining which of the first WAM and the second WAM to send the information to based on a load balancing scheme that distributes bits between the first WAM and the second WAM.

5. The method of claim 1, wherein a route to the destination exists via both the first WAM and the second WAM, the method comprising:
receiving multiple IP packets from the router, the multiple IP packets having a common destination, sending information corresponding to a first subset of the multiple IP packets to the first WAM and concurrently sending information corresponding to a second subset of the multiple IP packets to the second WAM.

6. The method of claim 1, comprising:
at the second edge module, decapsulating the transfer packet and forwarding information corresponding to the IP packet to the second WAM.

7. The method of claim 1, wherein the first WAM is coupled to the router via a single network link, wherein the second WAM is coupled to the router via a single network link.

8. A method of coordinating wideband anti-jam modems (WAMs), the method comprising:
receiving IP packets at the first edge module from a router, the IP packets having a destination reachable via a satellite communication link through a first WAM or a second WAM, wherein the router is configured with the first edge module as a default route;
for each packet of the IP packets, determining whether to send information corresponding to the packet to a first WAM or a second WAM, wherein the first edge module is communicatively disposed between the first WAM and the router, wherein a second edge module is communicatively disposed between the second WAM and the router;
for information that is to be sent via the first WAM, forwarding that information to the first WAM; and
for information that is to be sent via the second WAM, encapsulating the IP packet corresponding to that information in a transfer packet for the second edge module; and
sending the transfer packet to the router for forwarding to the second edge module.

9. The method of claim 8, wherein determining whether to send the information includes checking a table of forward destinations for the first edge module and checking a table of forward destinations for the second edge module, if a destination of the IP packet is listed in the table of forward destinations for the first edge module, determine that the IP packet is to be sent to the first WAM, if a destination of the IP packet is listed in the table of forward destinations for the second edge module, determine that the IP packet is to be sent to the second WAM.

10. The method of claim 9, wherein information corresponding to a first IP packet is sent to both the first WAM and the second WAM.

11. The method of claim 8, wherein a route to a destination for an IP packet exists via both the first WAM and the second WAM, wherein determining whether to send the information includes determining which of the first WAM and the second WAM to send the information to based on a load balancing scheme that distributes bits between the first WAM and the second WAM.

12. The method of claim 8, comprising:
at the second edge module, decapsulating each transfer packet and forwarding information corresponding to the corresponding IP packet to the second WAM if the corresponding IP packet has a destination reachable via the second WAM.

13. The method of claim 8, wherein the first WAM is coupled to the router via a single network link, wherein the second WAM is coupled to the router via a single network link.

14. A program product comprising:
a non-transitory processor readable medium having software stored thereon, the software, when executed by one or more processing devices, configured to:
receive an IP packet from a router, wherein the router is configured with a first device having the one or more processing devices therein as a default route;
determine whether to send the information corresponding to the IP packet via a first wideband anti-jam modem (WAM) corresponding to the first device or via a second WAM corresponding to a second device;
if the information is to be sent via the first WAM, forwarding information corresponding to the IP packet to the first WAM; and
if the information is to be sent via the second WAM:
encapsulate the IP packet in a transfer packet for the second device corresponding to the second WAM; and
send the transfer packet to the router for forwarding to the second device corresponding to the second WAM.

15. The program product of claim 14, wherein determine whether to send the information includes check a table of forward destinations for the first device and check a table of forward destinations for the second device, if a destination of the IP packet is listed in the table of forward destinations for the first device, determine that the IP packet is to be sent to the first WAM, if a destination of the IP packet is listed in the table of forward destinations for the second device, determine that the IP packet is to be sent to the second WAM.

16. The program product of claim 15, wherein information corresponding to the IP packet is sent to both the first WAM and the second WAM.

17. The program product of claim 14, wherein a route to the destination exists via both the first WAM and the second WAM, wherein determine whether to send the information includes determine which of the first WAM and the second WAM to send the information to based on a load balancing scheme that distributes bits between the first WAM and the second WAM.

18. The program product of claim 14, wherein a route to the destination exists via both the first WAM and the second WAM, and the instruction cause the one or more processing devices to:
receive multiple IP packets from the router, the multiple IP packets having a common destination, send information corresponding to a first subset of the multiple IP packets to the first WAM and concurrently send information corresponding to a second subset of the multiple IP packets to the second WAM.

19. The program product of claim 14, wherein the first device is coupled to the router via a single network link, wherein the second device is coupled to the router via a single network link.

20. The program product of claim 14, wherein the first device is the first WAM.

* * * * *